July 7, 1970  W. RAST  3,519,167
STORAGE AND DISPENSING DEVICE FOR AERATED LIQUIDS
Filed May 13, 1968  4 Sheets-Sheet 1

INVENTOR

WLODZIMIERZ RAST

By  Oldham & Oldham attys

United States Patent Office 3,519,167.
Patented July 7, 1970

3,519,167
STORAGE AND DISPENSING DEVICE FOR
AERATED LIQUIDS
Wlodzimierz Rast, 38 Hillcrest Drive, Eden Hills,
South Australia, Australia
Filed May 13, 1968, Ser. No. 728,486
Claims priority, application Australia, May 10, 1967,
21,586/67
Int. Cl. B67b 7/26
U.S. Cl. 222—82                    3 Claims

ABSTRACT OF THE DISCLOSURE

A storing and dispensing device for aerated liquids using a flexible membrane in a container so arranged that air pressure on one side of the membrane keeps the liquid under pressure to prevent the degasification of the liquid, a disperser on the container maintaining the air pressure to force out the liquid through an outlet valve.

---

Figure 1:
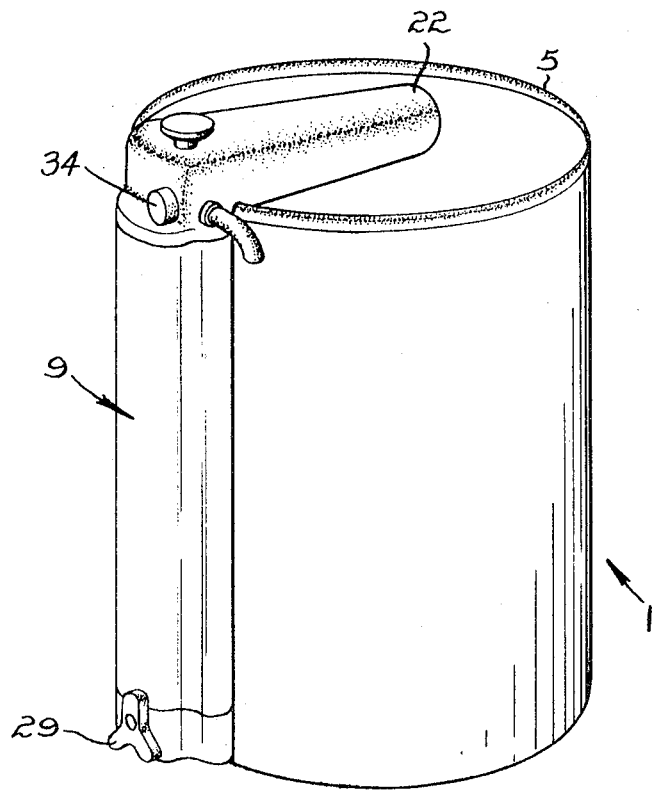

This invention relates to a storage and dispensing device for aerated liquids.

It is well known that when liquids such as beer which contain a gas under pressure are stored for any length of time after being first opened that the gas escapes from the liquid and the liquid then loses its sparkle and effectiveness.

In the case of beer it is customary to apply carbon dioxide to the liquid which is held under pressure of say 10 lbs. per square inch, and so long as the liquid is sealed in the container under this pressure there will be no loss of the carbon dioxide and consequently the beer will keep its sparkle and head, but after the container is opened and is no longer under pressure the gas will quickly be lost from the container.

It is the object of this invention to provide a form of container which will allow dispensing of the liquid content over a period of time without loss of the gas from the content.

The object is achieved by providing the container with a flexible membrane such that as liquid is withdrawn from the container the membrane will follow the level of the liquid and will keep the necessary pressure on the liquid to prevent degasification of the liquid.

The invention can be carried out in various ways but according to a preferred embodiment the container is provided with a flexible membrane within it which is of such a nature that the membrane can be forced down in the container to at all times maintain pressure on the liquid, the space in the container on the outer side of the membrane being maintained under pressure by means of a pump or the like which thus forces the membrane down onto the liquid with the required pressure, dispensing means being provided such as a tap which communicates with the liquid space in the container and allows withdrawal of liquid from the container, preferably under pressure exerted on the membrane by air or the like pumped into the container to maintain the necessary pressure on the membrane.

It will of course be obvious that the actual construction of the invention can be widely varied in its application but to enable the nature to be fully appreciated a more detailed embodiment will now be described with reference to the accompanying drawings but it is to be clear that the invention need not necessarily be limited to this embodiment, the scope being defined in the claims herein.

Figure 2:
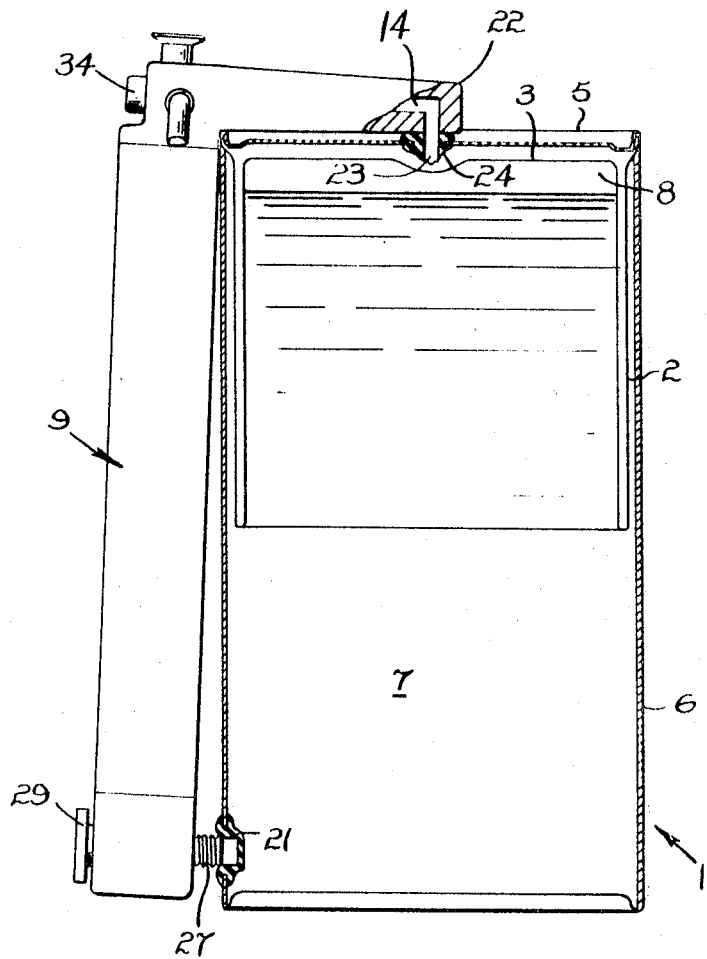
Figure 3:
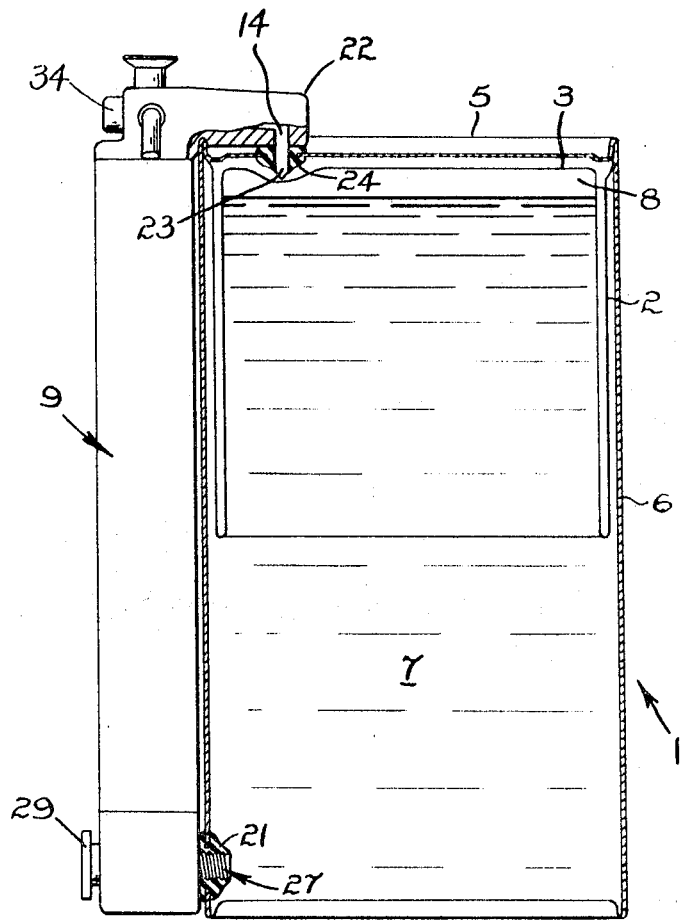
Figure 4:
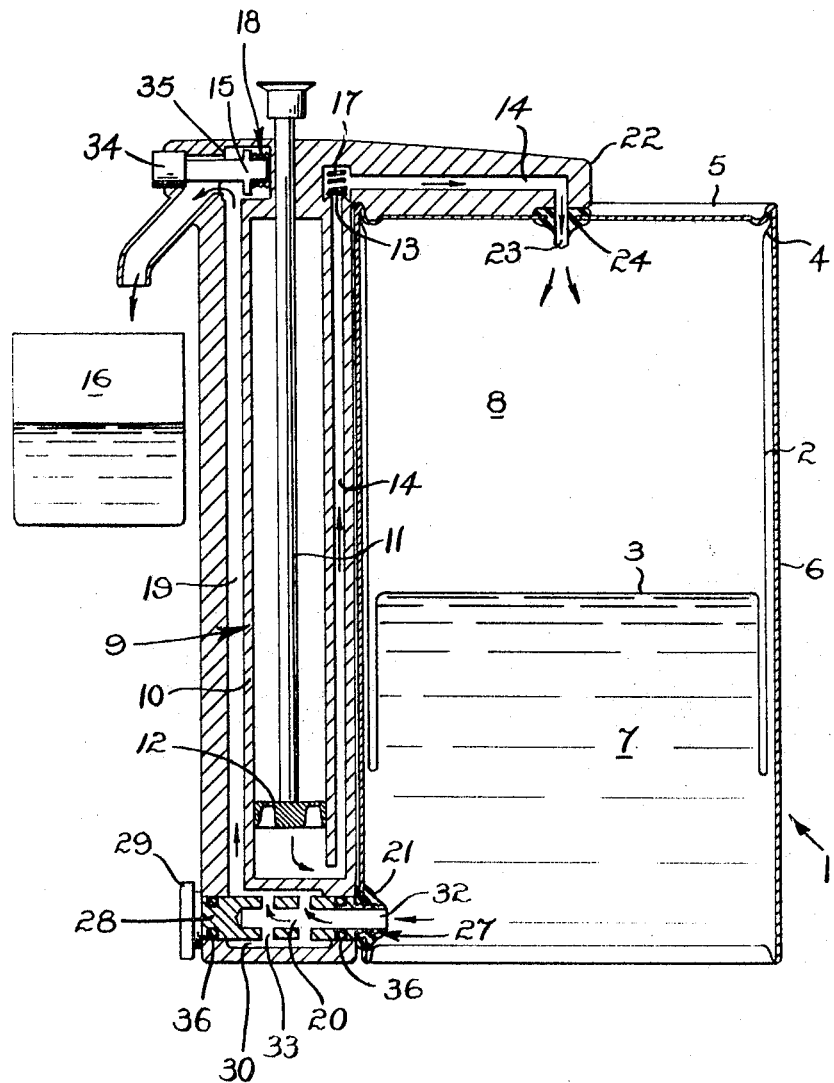

In the drawings:

FIG. 1 is a perspective view of the container with the pump thereon,

FIG. 2 is a sectional side elevation showing the pump engaged at the top of the container but in the act of engagement at the bottom of same prior to piercing of the container, FIG. 3 shows the pump fully engaged and ready to pressurise the space between the inside of the container and the outside of the plastic bag, and FIG. 4 is a vertical section of the complete mechanism, showing it in the condition of discharging liquid from the container under pressure of the air in the container, this view being diagrammatic and the dispenser somewhat enlarged to more clearly show the operating mechanism.

A container 1 of metal or the like adapted to contain beer or a similar carbonated or otherwise gasified liquid has within it a flexible membrane 2 which is in the form of an elongated tube or bag to fit the inner wall of the container but closed across its lower end by a wall 3 and having its edge 4 fixed to the container 1 preferably at the top 5, although it could be secured at an intermediate point, the diameter of the flexible membrane 2 however being such that it can fold to lie against the wall 6 of the container and the top 5 of the container when the container is filled with liquid but can be distorted to follow the level of the liquid designated 7, downwardly until the container is emptied.

On on side of this membrane therefore is the liquid 7 containing the carbon dioxide or similar gasifying medium while on the other side of the membrane is an air space 8 which communicates with a dispenser 9 which is attachable to the container 1 but can be removed when the container has been emptied and secured to further containers, but the dispenser could be arranged to be part of the container itself and of disposable form so that it can be discarded with the container, for which purpose the pump could be made of plastic materials with simple flap valves or the like, the pump being however capable of maintaining a pressure of say 10 to 12 lbs. per square inch within the container so as to keep this loading on the liquid within the container.

The dispenser 9 is however preferably formed as a separate unit to be attached to a disposable can 1 as is shown in the form illustrated. In this case the attachable dispenser 9 comprises a pump having a cylinder 10 having within it a plunger 11 which is fitted with a cup 12 to provide the necessary pressure for the can 1, the cylinder 10 being provided with a nonreturn valve 13 in a duct 14 so that air compressed in this cylinder 10 can be ejected into the upper part of the container 1 above the membrane 2 and the pressure in the container will then be held to provide the means of keeping the wall 3 of the membrane 2 down on the liquid 7 in the can 1 and to provide the force to drive the liquid 7 from the can through a discharge valve 15 into a glass 16 or the like when a quantity is to be served. The valves 13 and 15 have return springs 17 and 18, respectively, the valve 15 being disposed in an outlet duct 19 leading from a fluid outlet tube 20 which forms the means of opening a pierceable seal 21 in the lower edge of the can.

The method of joining the pressure generating and liquid dispenser 9 to the can 1 can of course vary but according to the form shown the pump has an extension 22 terminating in a nipple 23 which is shaped to pierce a seal 24 in the top 5 of the can to allow an air flow into the can from the pump through the duct 14 but to make a seal at the pierced locality which will ensure that the pressure will not be lost. The seal 24 can be made of plastic.

The lower end of the dispenser pump 9 body is provided with a fluid outlet tube 20 as said which has a threaded end 27 adapted to screw into the pierceable seal 21 and which is adapted to lock the device to the can so that when the dispenser nipple 23 has pierced the top of the can, and the bottom of the dispenser is locked to the can by the screw thread 27 the dispenser can be actuated.

The lower piercing tube 20 can conveniently comprise a hollow movable piercer tube 20 as shown having its outer end 28 closed and provided with an operating knob 29 and an inner end threaded as stated to engage the resilient closure member 21 in the can, the piercer tube 20 being axially movable but sealed in relation to the fluid outlet 30 which leads to the dispenser valve 15 so that, when the thread 27 is engaged in the seal 21, a screwing movement of the knob 29 will cause the tube 20 to axially move into the seal until such time as its end 32 bursts the seal 21 to give communication with the inside of the can. This drawing in action will be apparent from FIG. 2.

The piercer tube 20 is provided with a series of apertures 33 giving communication between the inside of the tube 20 and the outlet 30. The screw thread 27 is so arranged that it makes a liquid-tight seal with the seal 21 before it pierces the seal 21 so that no liquid is lost while communication is established with the inside of the can 1. Thus as the tube 20 screws forward in the sealing member 21 a liquid-tight seal is effected before the end of the sealing member is ruptured to break the seal to thereby ensure that an adequate seal with the inside of the container exists to prevent spillage of liquid, even when under pressure, at this point.

A push-button 34 operates the valve 15 which normally engages the seat 35 under influence of the spring 18.

The seal 21 can be made of plastic or the like.

The piercer tube 20 is sealed in the body by means of O-rings 36 so that no leakage can take place from it where it communicates with the fluid outlet duct 19 to the dispenser valve.

It will be realised of course that these seals can be varied and a seal similar to the lower seal could also be used at the upper end but generally, as it is only necessary to make an air-tight seal at the top of the container, it is sufficient to provide a pierceable member at this end which can be of plastic or rubber or the like but which will be ruptured when the dispenser is pulled downwardly to pierce the seal, the seal 24 of course engaging the piercer 23 to form an air-tight seal therewith to prevent escape of air from the space 8 between the inside of the top of the can 1 and the part 3 of the bag within the can.

The seal, or the piercer, can be so arranged that there is no danger of piercing the membrane. This can be achieved by having a rounded or apertured end on the piercer, or the end of the seal can be so constructed that as it is ruptured it forms petals which push away the membrane, the same petal construction being possible with the lower seal.

The seals could of course comprise disc seals or plugs held in a plastic or rubber grommet so that these seals can be pushed out into the can when the seal is to be broken, the grommet then forming an air-tight and liquid-tight member with the piercer, but it will be realised that various types of seal can be devised within the spirit of this invention.

A pressure relief valve could be included which would ensure that only a safe pressure can be reached within the can, which pressure relief valve can again be conveniently formed in the dispenser body but is not shown as such valves are well known.

The disposable can could be provided with a tube of resilient or solid form which leads from the pierceable member 21 near the bottom of the can to the centre of the can, and this tube could form part of the plastic or similar flexible member fitted to the can to allow the connection whereby the liquid is withdrawn from the can to be made.

From the foregoing it will be realised that a container 1 is visualised which can hold a substantial quantity of beer or other carbonated or gasified liquid, which liquid can be dispensed as required from time to time through the dispenser 9 but which liquid will at all times be held under the required pressure by means of the flexible membrane 2 and the pressure of the air exerted on this membrane by the pump or other pressure-delivering device so that irrespective of the time taken to consume or use the liquid, there will be no significant loss of gas from the liquid because the liquid will at all times be maintained under the required pressure conditions and will be in a sealed compartment in the container so that loss of gas could not take place from the liquid.

A bag can of course be formed of polythene or any other suitable flexible material and can be lined with cellophane or other material which is impervious to the flow of gas and liquid.

The air inlet and liquid outlet for the container can be in any suitable position, including the bottom.

What I claim is:

1. A storing and dispensing device for aerated liquids in which the liquid is held in a sealed disposable container which has a flexible membrane attached to its wall so that air supplied to one side of the said membrane will force the liquid from the container on the other side of said membrane, characterized by a pair of seals in the container one on each side of the membrane, and by a detachable dispenser means of inverted L-shape and adapted to be clamped to the container, said dispenser means comprising an air pump means having a first and a second member adapted to pierce seals in the container, the first of said piercing members being positioned to apply air pressure to the container on one side of the membrane through one of the said seals, the second said piercing member being positioned to form an outlet tube to allow liquid to flow from the container through the said tube when the other seal is pierced thereby, and a flow control valve in said dispenser means operatively connected to the said outlet tube, whereby the dispensing means form a unit separate from the container to be usable with a series of containers.

2. A storing and dispensing device according to claim 1 characterized in that said first piercing member comprises an air inlet nipple which is first engageable in its associated seal in the top of the container in a downward direction, and the liquid outlet tube is then engageable in its associated seal, said dispenser means including an air pump body, said second piercing means being carried by said body and being sealed in relation thereto, the said liquid outlet tube having a screw thread thereon to engage and screw into its associated seal when the tube is rotated to first lock to the said seal and only then to pierce the said seal on continued axially inward movement.

3. A storing and dispensing device according to claim 1 characterized in that said first piercing member comprises an air inlet nipple which is first engageable in its associated seal in the top of the container in a downward direction, and the liquid outlet tube is then engageable in its associated seal, the said liquid outlet tube having means to lock to the said seal by movement in a horizontal direction before actually piercing the said seal to hold the detachable dispenser means firmly on the container.

References Cited

UNITED STATES PATENTS

| | | | |
|---|---|---|---|
| 206,211 | 7/1878 | Austin | 222—383 X |
| 601,877 | 4/1898 | Lochmann | 222—386.5 X |
| 1,284,462 | 11/1918 | Runyen | 222—383 X |
| 2,328,863 | 9/1943 | Threm | 222—490 X |
| 2,890,652 | 6/1959 | Jaunch et al. | |
| 3,067,787 | 12/1962 | Salk | 222—490 X |
| 3,240,392 | 3/1966 | Nicko | 222—82 |

FOREIGN PATENTS 761,589  1/1934  France.

ROBERT B. REEVES, Primary Examiner

N. L. STACK, Jr, Assistant Examiner

U.S. Cl. X.R.

222—85, 386.5